Nov. 10, 1959  J. F. HOCH  2,912,536
BRAKE TRAVEL INDICATOR
Filed Sept. 3, 1957

INVENTOR.
JOSEPH F. HOCH

ATTORNEYS.

United States Patent Office
2,912,536
Patented Nov. 10, 1959

2,912,536

BRAKE TRAVEL INDICATOR

Joseph F. Hoch, Sierra Madre, Calif., assignor to Sierra Precision, Inc., Monrovia, Calif., a corporation of California Application September 3, 1957, Serial No. 681,823

7 Claims. (Cl. 200—83)

The invention relates to braking devices for automotive vehicles and has particular reference to an indicating device for installation in the booster housing of a hydraulic of pneumatic brake assembly for the purpose of indicating by some appropriate means to the driver the amount of brake travel remaining effective for the purpose of applying the brakes to the vehicle. This is an improvement on co-pending application Serial No. 650,-660, filed April 4, 1957, now Patent Number 2,873,436.

In the operation of hydraulic and pneumatic brakes of the type herein made reference to, brakes are applied by the application of power to a sealed diaphragm chamber whereby the diaphragm is moved together with a piston rod, the piston rod being connected to the brake shoes in such a manner that when moved the shoes are extended outwardly into engagement with a surrounding brake drum. Under ordinary conditions when normal temperatures prevail in the brake drum and brake drum assembly, movement of the piston throughout an initial portion of the throw of the piston begins the application of the brake shoes to the brake drum in a gradual fashion to initiate the braking operation. At this stage and under ordinary conditions it is unnecessary to use the full throw of the piston in order to accomplish a full application of braking force.

Conditions frequently exist however, where this does not take place. One such condition is that wherein there has been a rather light application of braking force between the brake shoes and brake drum for a relatively long period of time as for example, when the vehicle is traveling down a long hill. Such a light application of the braking force is sufficient by reason of contingent presence of the frictional effect to raise the temperature of the brake drum in particular to a relatively high degree. The excessive rise in temperature of the brake drum causes it to expand and finally under extreme conditions to expand outwardly to such an extent that the full throw of the piston is insufficient to create enough movement outwardly of the brake shoes to reach a point of engagement with brake drum. When this happens all braking power is lost. This is the condition which exists when trucks and trailers run away down a long hill.

Although these are the conditions which need to be guarded against most frequently there are however, other comparable conditions which prevent the piston when moved to the full length of its stroke to perform the necessary braking action.

Since there is very frequently a raise in temperature in the brake drum sufficient to expand it to a degree, there is a variation in the point at which the piston causes the brake shoes to engage. This may be well beyond the point of engagement under ordinary cold conditions and under which there remains a safe braking potential although specific conditions may vary with a particular booster construction. A dangerous condition begins to exist when there remains only a fraction of an inch of piston travel within which the piston is able to apply the brakes.

Although a device has been proposed to fit within the booster chamber in a position subject to actuation by the travel of the piston or piston assembly during the final stages of its movement which upon principle has been found highly efficacious, the device has depended upon electrical contacts which need to be kept clean. It will be appreciated that braking devices of the kind herein made reference to are carried underneath trucks and trailers where they are subjected to moisture, dust, dirt and grease which gradually accumulates despite washings and cleanings over many months of use. Although such an indicator may perform with a high degree of satisfaction for a period of many months it is subject to improper operation under unexpected circumstances after a long period of use and those circumstances might well be the most critical circumstances which operation of the device is intended to guard against.

It is therefore among the objects of the invention to provide a new and improved brake indicating device which is weather proof to a high degree and virtually proof against ineffective operation as a result of dust, dirt and grease accumulations over long periods of time.

Another object of the invention is to provide a new and improved brake indicating device which is positive in its action and which is capable of assuring the making of a necessary electrical contact even though there may be present only a relatively light pressure over a short space interval.

Still another object of the invention is to provide a new and improved brake indicating or brake travel indicating device which is compact and self-contained in that independent electric units are located at strategic locations in a multiple arrangement so that even though one of the units might become ineffective the indicating potential will not be lost as long as the other unit remains in the device.

Still further among the objects of the invention is to provide a new and improved brake indicating or brake travel indicating device which is constructed of independent units so mounted with respect to an overall assembly that the units can be readily removed and replaced and so that also the entire assembly may be removed and replaced with equal facility whenever servicing or replacement might be indicated as desirable.

With these and other objects in view the invention consists in the construction arrangement and combination of the various parts of the device whereby the objects contemplated are attained as herein set forth, pointed out in the appended claims and illustrated in the accompanying drawings.

Figure 1:
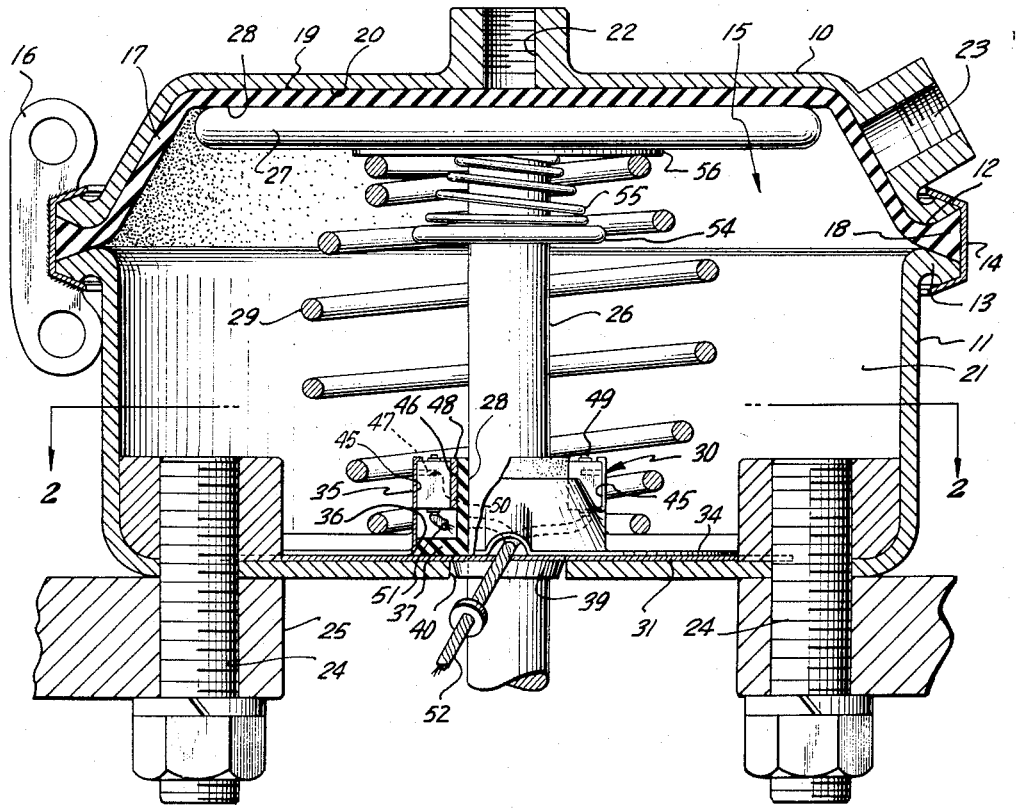
Figure 1 is a longitudinal sectional view of a brake actuating mechanism showing the brake travel indicator partially in section.
Figure 2:
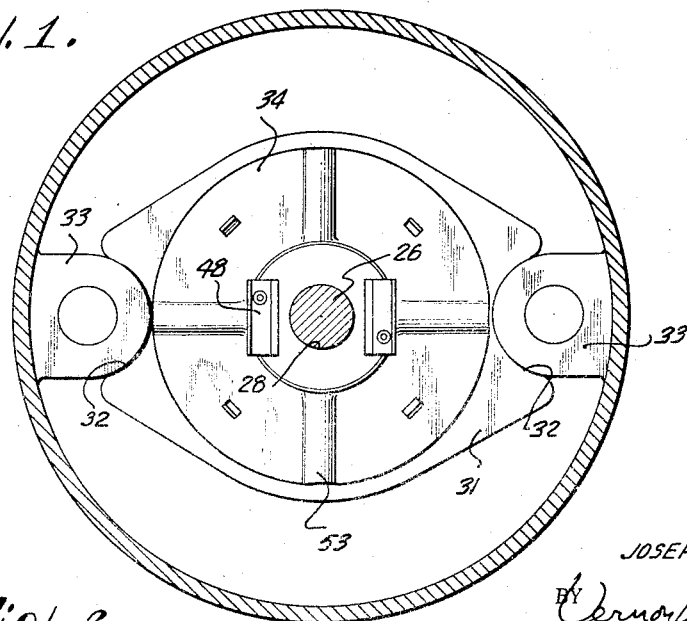
Figure 2 is a cross-sectional view taken on the line 2—2 of Figure 1.
Figure 3:
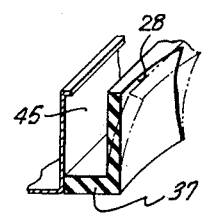
Figure 3 is a fragmentary longitudinal sectional view of the brake travel indicator unit.

In an embodiment of the invention chosen for the purpose of illustration there is shown a booster unit as that term is commonly used which consists of a pressure plate 10, and a non-pressure plate 11, both of which have a somewhat dished form and are joined together at their respective rims 12 and 13 by means of a clamping ring 14 in order to form generally a chamber 15. A special clamp 16 may be employed to assist in the application of the clamping ring.

A diaphragm 17 of flexible character, usually laminated rubber, is secured at a rim 18 thereof between the rims 12 and 13 so that between an upper face 19 of the diaphragm and a lower face 20 of the pressure plate there may be formed when pressure is applied a suitable pressure cavity. Below the diaphragm and within the non-pressure plate 11 and a portion of the pressure plate 10 there is formed a cavity 21 which is ordinarily at atmospheric pressure. A pressure intake port 22 provides for the passage of pressure to the diaphragm and an exhaust port 23 provides for exhaust of the pressure fluid therefrom.

Bolts 24 may be employed for fastening the booster unit to a portion 25 of the frame of the vehicle upon which the brake is mounted (not shown).

A piston assembly comprises in the main, a piston 26 mounted upon a disk 27 which is applied against a lower face 28 of the diaphragm 17. The piston assembly is biased in an upper direction as viewed in Figure 1 to maintain brakes (not shown) in release condition by means of a relatively heavy spring 29. As will be noted from the foregoing description, when fluid pressure is applied to the upper face of the diaphragm the piston 26 will be moved downwardly throughout the length of its stroke and this is the movement which is relied upon to move brake shoes outwardly into engagement with the brake drum.

To indicate the amount of travel remaining available in the piston for the application of brakes there is installed in the booster unit and particularly within the cavity 21 defined by the non-pressure plate 11 a switch assembly indicated generally by the reference character 30, more particularly the switch assembly comprises a sheet metal plate 31 having notches 32 therein on opposite sides adapted to encircle bosses 33 which are part of the non-pressure plate 11 thereby to properly orient the switch assembly 30 in its position.

An upper sheet metal plate 34 here shown as having a circular shape overlies the plate 31 and is formed at its mid-portion to a casing 35. The casing provides a cylindrical interior 36 which surrounds the piston 26 and provides a substantially large annular space therearound.

Within the annular space is a plug 37 which can be made of rubber, neoprene or other appropriate resilient material. The plug fits snugly within the cylindrical interior 26 and has a central aperture 38 through which the piston 26 slides freely. A collar 39 extending downwardly from the lower face of the plate 31 is adapted to center the switch assembly within a hole 40 at the center of the non-pressure plate 11.

On diametrically opposite sides of the casing 35 there are provided substantially rectangular recesses 45. The rubber plug is provided with complementary substantially rectangular recesses 46 which together with the recesses 45 on the respective sides provide rectangular spaces. Although in the chosen embodiment these spaces have a rectangular form it will be appreciated that this form is one of convenience and that other geometric forms may be found equally appropriate. Into each of the recesses 45 extend a set of prongs 47. In each of the recesses thus formed between the rubber plug and the casing there is mounted a switch box 48 which is identical for each side of the device. The switch assembly is one containing what is commonly known as a microswitch. A switch arm 49 extends upwardly as viewed in Figure 1 from each of the switch assemblies. In the body of each of the switch assemblies there is provided a pair of prong recesses 50 for reception of the prongs 47 by which engagement the switch assembly in each instance is firmly anchored in proper position. A pigtail or electric lead 51 extends from the switch assembly in each instance downwardly to a common insulated cable 52, the cable being one capable of extending through one of the several tunnels 53 so as to conduct the electric leads outwardly to a location where they can be connected to appropriate indicating or signal devices in a remote location (not shown).

To actuate the switches by means of the switch arms 49 there is provided a switch actuating plate 54 to which a conical coiled spring 55 is attached at its lower end. At the upper end of the spring 55 means is provided for connecting the spring to a washer 56, the washer in turn being held in an uppermost position as viewed in Figure 1 by the uppermost turn of the relatively heavy coiled spring 29. It will be understood and appreciated that the spring 55 is relatively light and as shown is much shorter than the length of the spring 29.

In operation as the pressure fluid is applied the piston assembly begins to move downwardly. Throughout the initial portion of its movement which is the major portion of the total aggregate movement brakes can be applied with a varying degree of pressure. During this movement there will be no actuating of the switches. When however the piston 26 moves downwardly in the view selected without application of the brakes to a point where the switch actuating plate 54 strikes the switch arms 49, the switches will be actuated and energize the electric circuit, portions of which are shown, so that suitable indicators become actuated. This will occur when there is travel remaining in the piston 26 equal to the length of the spring 55. This amount of travel therefore will be left remaining for the potential application of brakes and can be described as reserve potential. When there is no more reserve potential than that equal to the length of the spring 55 it is an indication to the operator of the vehicle that appropriate precautionary steps should be taken such, for example, as stopping the vehicle and permitting the brakes to cool. Although in the chosen embodiment the switch arms are shown at the same level they may, if desired, be mounted at different levels so that the first switch energized provides a precautionary warning and the next switch a final warning.

After the brakes have been permitted to cool for a time, a trial reapplication of the brakes can be made. If upon the trial application the brakes engage without energization of the switches, it will be sufficient to indicate that there is a greater remaining amount of brake travel than the minimum reserve which has previously been indicated, namely, an amount of reserve travel equal to the length of the spring 55.

It will be further understood and appreciated that the entire switch mechanism is located entirely within the cavity 21 and that the only access to the cavity for dust, dirt, moisture and grease is through the hole 40 which is substantially blocked by the collar 39 and the rubber plug 37. Even under circumstances where dirt creating substances might find their way into the cavity 21 by way of vent holes, for example, there is no means by which they can coat electric switch points since these are entirely housed within the switch assembly. The presence of even a substantial portion of dirt upon the switch arms 46 will not detract from effective performance because these switch arms need to move throughout only a very short distance in order to operate the switches. Further still, even though one of the switches might be rendered ineffective the switch actuating plate will be pressed in an effective fashion against the remaining switch arm and this alone will be sufficient to indicate the amount of brake travel remaining at a critical point.

Whenever the occasion should arise where switch assemblies need replacing the booster unit is opened by separating the pressure plate and non-pressure plate from each other to give access to the switch assembly 30.

Once the relatively heavy spring 29 is removed the switch assembly 30 can be lifted clear and withdrawn from a positiion around the piston 26. After this has been accomplished the portions of the rubber plug 37 lying adjacent the switch boxes 48 at the area of the rectangular recesses 46 can be flexed inwardly and the switch boxes pulled loose from the prongs 47. Thereafter the wire can be disconnected and reconnected to a new switch box and the switch box reinserted by flexing the rubber plug for that purpose after which the rubber like material will return to position and effectively incase the new switch box.

From the foregoing description it will be understood and appreciated that the switch assembly is a compact unitary device, all parts of which are self-contained and which can be applied as a unit to the booster assembly without necessity of any change whatsoever in the construction of the booster assembly itself. The parts moreover are of such uniform and packaged construction that they are easily serviced and replaced and at all times are effectively protected against dirt and deterioration so that the device will serve over long periods of time with a dependable degree of safety.

Having described my invention, what I claim as new and desire to secure by Letters Patent is:

1. A reserve brake potential indicator comprising a housing having a chamber therein, a flexible partition extending across said chamber and separating said chamber into a pressure cavity and a non-pressure cavity, a piston assembly engaging said partition and including a piston extending through one side of said housing and a relatively heavy spring acting between said assembly and said housing, and an electric switching means in said chamber comprising a base in engagement with an inside portion of said one side of said housing, a portion of said base being formed into a casing means surrounding said piston and extending into said non-pressure cavity, means forming a recess in said casing means, a sealed microswitch unit removably received in said recess having flexible electric leads attached directly thereto and extending outwardly of the casing and the housing, a switch arm on the side of said unit facing said diaphragm, a switch actuating plate around said piston and a relatively light spring between said switch actuating plate to said piston assembly, one end of said spring and said switch actuating plate having a fixed switch actuating position during the final stages of travel of said piston assembly and the other end of the spring being movable with said piston, whereby to actuate said microswitch unit.

2. A reserve brake potential indicator comprising a housing having a chamber therein, a flexible partition extending across said chamber and separating said chamber into a pressure cavity and a non-pressure cavity, a piston assembly engaging said partition and including a piston extending through one side of said housing and a relatively heavy spring around said piston and acting between said assembly and said one side of said housing, and an electric switching means in said chamber comprising a base in engagement with an inside portion of said housing, a portion of said base being formed into a casing means around said piston, means forming a plurality of recesses in said casing means, a sealed microswitch unit of substantially the same configuration as said recesses removably mounted in each of said recesses, a switch arm on the side of each said microswitch unit operable in response to movement of said diaphragm, a switch actuating plate around said piston and a relatively light spring having one end in contact with said switch actuating plate and the other end in contact with said piston assembly, one end of said spring and said switch actuating plate being tiltable and having switch actuating positions and the other end of said spring being movable during the final stages of travel of said piston assembly, whereby to actuate at least one of said switches.

3. A reserve brake potential indicator comprising a housing having a chamber therein, a flexible partition extending across said chamber and separating said chamber into a pressure cavity and a non-pressure cavity, a piston assembly engaging said diaphragm and including a piston extending through one side of said housing and a relatively heavy spring around said piston and acting between said assembly and housing, and an electric switching means in said chamber comprising a base in engagement with an inside portion of said housing, a portion of said base being formed into a casing surrounding said piston and extending into said non-pressure cavity, a resilient plug in said casing having an outside wall in engagement with said casing and an inside wall forming an aperture with the wall in sliding engagement with said piston, means forming recesses on diametrically opposite sides of said casing, means forming flexible distendable complementary recesses in said plug, said recesses having each an open side facing said diaphragm, a microswitch unit removably receivable in each pair of complementary recesses, a switch arm on the side of each unit facing open sides of the recesses and said diaphragm, a switch actuating plate around said piston and a relatively light spring between said switch actuating plate and said piston assembly having a resiliently pressed position of potentially operative engagement with said switch arms, said switch actuating plate being movable through switch actuating positions during the final stages of travel of said piston assembly, whereby to actuate said switches, said plug being distortable in the area of said respective recesses whereby to implement removal and replacement of said switch units.

4. A reserve brake potential indicator comprising a housing having a chamber therein, a diaphragm between said plates separating said chamber into a pressure cavity and a non-pressure cavity, a piston assembly engaging said diaphragm and including a piston extending through one side of said housing and a relatively heavy spring around said piston and acting between said assembly and said housing, and an electric switching means in said chamber comprising a base in engagement with an inside portion of said housing and having a tunnel therein for electric wires, a portion of said base being formed into a casing surrounding said piston, a resilient plug in said casing spanning the distance between the casing and the piston and having an inner wall forming an aperture and engaging said piston, means forming recesses on opposite sides of said casing, means forming complementary flexibly distendable recesses in said plug having an open side facing said diaphragm, a microswitch unit removably receivable in each respective pair of complementary recesses, a switch arm on the side of each unit facing said diaphragm, a switch actuating plate around said piston and a relatively light spring between said switch actuating plate and said piston assembly, said switch actuating plate being movable through switch actuating positions during the final stages of travel of said piston assembly, whereby to actuate said switches, flexible electric wires attached directly to said microswitch units and extending from said microswitch units loosely through at least one of said tunnels, said plug being distortable in the area of said respective recesses whereby to implement removal and replacement of said microswitch units.

5. A reserve brake potential indicator comprising a housing including a dished pressure plate, a dished non-pressure plate joined to the pressure plate forming a chamber, a diaphragm between said plates forming a non-pressure cavity on the side of said chamber adjacent the non-pressure plate, a piston assembly comprising a spring keeper plate engaging said diaphragm, a piston extending through said non-pressure plate and a relatively heavy spring surrounding said piston and acting between said assembly and said non-pressure plate, and an electric switching means in said cavity comprising a sheet metal plate in engagement with an inside face of said non-pressure plate, a portion of said sheet metal plate being formed into a casing surrounding said piston having an open side facing said diaphragm, a rubber plug in said casing having an inner wall slidably engaging said piston, means forming substantially rectangular shaped recesses on diametrically opposite sides of said casing and projections on the casing extending into said recesses, means forming complementary substantially rectangularly shaped flexibly distendable recesses in outer portions of said rubber plug and having open sides facing said diaphragm, a microswitch assembly of substantially rectangular configuration removably mounted in each of said recesses at a location beneath the respective projection, a switch arm on the side of each microswitch assembly facing said diaphragm, a switch actuating plate slidably mounted around said piston and a relatively light spring connecting said switch actuating plate to said spring keeper plate, said switch actuating plate being movable to switch actuating position during the final stages of travel of said piston assembly, whereby to actuate said switches, said rubber plug being distortable in the area of said respective rectangular recesses whereby to implement removal of said microswitch assemblies from beneath said projections and from said recesses and to effect replacement thereof.

6. A reserve brake potential indicator comprising a housing having a chamber therein, a pressure actuated piston in the chamber extending reciprocatably through a wall of said housing, a relatively heavy return spring between the piston and said wall of the housing and a relatively light spring having an extended length representative of a desired remaining length of braking travel for said piston, and an electric indicating means comprising an anchoring plate having portions in non-rotatable engagement with portions of said housing, a cylindrical casing on said plate in a position surrounding said piston, a plug of resilient plastic material in sliding sealing engagement with the piston, opposite microswitch units having switch arms facing said light spring, means forming opposite flexibly distendable resilient recesses in said plug and within said casing receptive respectively of said microswitch units, at least one wall of each said recess having an assembled position against said piston whereby to hold said wall in place and retain said microswitch unit in the recess, said one wall being deformable when disassembled from said piston, whereby to enable release of the respective switch unit held in the recess.

7. A reserve brake potential indicator comprising a housing having a chamber therein, a pressure actuated piston in the chamber extending reciprocatably through a wall of said housing, a relatively heavy return spring between the piston and said wall of the housing and a relatively light spring having an extended length representative of a desired remaining length of braking travel for said piston, and an electric indicating means comprising an anchoring plate having portions in non-rotatable engagement with portions of said housing, a cylindrical casing on said plate in a position surrounding said piston, a plug of resilient plastic material in sliding sealing engagement with the piston, a microswitch unit having a switch arm facing said light spring, means forming a flexibly distendable resilient recess in said plug and within said casing receptive of said microswitch unit, at least one wall of said recess having an assembled position against said piston whereby to hold said wall in place and retain said microswitch unit in the recess, said one wall being deformable when disassembled from said piston whereby to enable release of the switch unit held in the recess.

References Cited in the file of this patent
UNITED STATES PATENTS

| | | |
|---|---|---|
| 2,418,508 | Goepfrich | Apr. 8, 1947 |
| 2,489,419 | Kerfoot | Nov. 29, 1949 |
| 2,558,830 | Drane et al. | July 3, 1951 |
| 2,648,732 | Starbird | Aug. 11, 1953 |
| 2,751,458 | Kayuha | June 19, 1956 |
| 2,764,645 | Smith | Sept. 25, 1956 |
| 2,789,176 | Mercier | Apr. 16, 1957 |
| 2,800,549 | Guthrie | July 23, 1957 |
| 2,833,898 | De Lisse | May 6, 1958 |